United States Patent
Okamori

(10) Patent No.: US 12,327,481 B2
(45) Date of Patent: Jun. 10, 2025

(54) INFORMATION PROCESSING APPARATUS, INFORMATION PROCESSING SYSTEM, INFORMATION PROCESSING METHOD, AND PROGRAM

(71) Applicant: Sony Group Corporation, Tokyo (JP)

(72) Inventor: Atsushi Okamori, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 57 days.

(21) Appl. No.: 17/641,818

(22) PCT Filed: Aug. 13, 2020

(86) PCT No.: PCT/JP2020/030752
§ 371 (c)(1),
(2) Date: Mar. 10, 2022

(87) PCT Pub. No.: WO2021/075138
PCT Pub. Date: Apr. 22, 2021

(65) Prior Publication Data
US 2022/0327941 A1    Oct. 13, 2022

(30) Foreign Application Priority Data

Oct. 15, 2019 (JP) ................. 2019-188617

(51) Int. Cl.
*G08G 5/34* (2025.01)
*G05D 1/00* (2024.01)
(Continued)

(52) U.S. Cl.
CPC .............. *G08G 5/34* (2025.01); *G05D 1/106* (2019.05); *G08G 5/55* (2025.01); *G08G 5/57* (2025.01);
(Continued)

(58) Field of Classification Search
CPC .. G08G 5/0039; G08G 5/0069; G08G 5/0013; G08G 5/0021; G08G 5/0052;
(Continued)

(56) References Cited

U.S. PATENT DOCUMENTS

| 2017/0286892 A1* | 10/2017 | Studnicka | G06Q 20/389 |
| 2018/0005180 A1* | 1/2018 | Jalaldeen | G08G 5/025 |
| 2019/0130349 A1* | 5/2019 | Ferguson | G06Q 10/08355 |
| 2020/0064143 A1* | 2/2020 | Engle | G06Q 50/01 |

(Continued)

FOREIGN PATENT DOCUMENTS

| CN | 104662568 A | 5/2015 |
| CN | 109313035 A | 2/2019 |

(Continued)

OTHER PUBLICATIONS

International Search Report and Written Opinion mailed on Oct. 20, 2020, received for PCT Application PCT/JP2020/030752, Filed on Aug. 13, 2020, 10 pages including English Translation.

*Primary Examiner* — Faris S Almatrahi
*Assistant Examiner* — Dana F Artimez
(74) *Attorney, Agent, or Firm* — XSENSUS LLP

(57) ABSTRACT

There is provided a technology that a user can select an alternative destination useful for the user. An information processing apparatus according to an embodiment of the present technology includes a control unit. The control unit sets an alternative destination of a moving route of a moving body based on profile information of the user in a case where the moving route of the moving body intersects a moving route of other moving body.

8 Claims, 10 Drawing Sheets

(51) Int. Cl.
*G08G 5/55* (2025.01)
*G08G 5/57* (2025.01)
*B64U 101/30* (2023.01)
*B64U 101/64* (2023.01)

(52) U.S. Cl.
CPC ...... *B64U 2101/30* (2023.01); *B64U 2101/64* (2023.01); *B64U 2201/10* (2023.01)

(58) Field of Classification Search
CPC ........ G08G 5/00; B64C 39/024; B64C 39/02; G05D 1/106; G05D 1/102; G05D 1/0011; G05D 1/10; G05D 1/02; B64U 2101/60; B64U 2201/10; B64U 50/34; B64U 2101/64
See application file for complete search history.

(56) References Cited

U.S. PATENT DOCUMENTS

2020/0312161 A1* 10/2020 Dorum ................ G08G 5/0039
2020/0327491 A1* 10/2020 Nishikawa ......... G06Q 10/0833

FOREIGN PATENT DOCUMENTS

| | | |
|---|---|---|
| CN | 110060511 A | 7/2019 |
| JP | 2008-105591 A | 5/2008 |
| JP | 2017-130228 A | 7/2017 |
| JP | 2017-208678 A | 11/2017 |
| JP | 2018-43698 A | 3/2018 |
| JP | 6293369 B1 | 3/2018 |
| JP | 2019-23131 A | 2/2019 |
| JP | 2019-32754 A | 2/2019 |
| JP | 2019-119586 A | 7/2019 |
| WO | WO-2015061008 A1 | 4/2015 |
| WO | WO-2017210292 A1 | 12/2017 |
| WO | WO-2019027735 A1 | 2/2019 |

* cited by examiner

Location and time series information of user

| Date and time | Latitude | Longitude |
|---|---|---|
| 2019/4/10 08:10 | 35.681382 | 139.766084 |
| 2019/4/10 08:20 | 35.630152 | 139.74044 |
| 2019/4/10 08:30 | 35.6197 | 139.728553 |
| 2019/4/10 08:40 | 35.6197 | 139.728553 |
| ⋮ | ⋮ | ⋮ |

FIG.2

Location and time series information of user

| Landmark | Latitude | Longitude |
|---|---|---|
| Tokyo station | 35.681382 | 139.766084 |
| Shinagawa station | 35.630152 | 139.74044 |
| Osaki station | 35.6197 | 139.728553 |
| XY building | 35.63407 | 139.714577 |
| ⋮ | ⋮ | ⋮ |

FIG.3

Flight plan information managed by drone control service server

| Flight area ID | Date and time | Airframe ID |
|---|---|---|
| 10 | 2019/5/10 10:00:00 - 10:04:00 | 1234 |
| | 2019/5/10 10:05:00 - 10:09:00 | 2345 |
| | 2019/5/10 10:10:00 - 10:14:00 | 3456 |
| | ... | ... |
| 11 | 2019/5/10 10:00:00 - 10:04:00 | 1234 |
| ... | ... | ... |

FIG.5

List of destinations

| Landmark | Distance to receiving drone port | Address of receiving drone port |
|---|---|---|
| Tokyo station | 120m | SS |
| Shinagawa station | 0m | XX |
| Osaki station | 240m | YY |
| XY building | 0m | ZZ |
| ... | | |

FIG.11

INFORMATION PROCESSING APPARATUS, INFORMATION PROCESSING SYSTEM, INFORMATION PROCESSING METHOD, AND PROGRAM

CROSS-REFERENCE TO RELATED APPLICATIONS

The present application is based on PCT filing PCT/JP2020/030752, filed Aug. 13, 2020, which claims priority to Japanese Application No. 2019-188617, filed Oct. 15, 2019, the entire contents of each are incorporated herein by reference.

TECHNICAL FIELD

The present technology relates to an information processing apparatus, an information processing system, an information processing method, and a program.

BACKGROUND ART

In the related art, it has been proposed to utilize a system including a plurality of moving bodies, for example, in the case of taking aerial photographs of scenery or the like, or in the case of remote patrol security, or the like. In such a system, when it is difficult for the moving body to reach a destination, a technique of changing the destination to another area is employed (for example, Patent Literature 1).

CITATION LIST

Patent Literature

Patent Literature 1: Japanese Patent No. 6293369

DISCLOSURE OF INVENTION

Technical Problem

However, in the technique described in Patent Literature 1, an alternative destination is a place set in advance, and the alternative destination is not a place being convenient for a user.

Accordingly, the present disclosure proposes a technique in which a user can select an alternative destination useful for the user.

Solution to Problem

In order to solve the above problems, an information processing apparatus according to an embodiment of the present technology includes a control unit.

The control unit sets an alternative destination of a moving route of a moving body based on profile information of a user in a case where the moving route of the moving body intersects a moving route of other moving body.

The control unit may acquire the profile information in a case where the moving route of the moving body intersects the moving route of the other moving body, and list a plurality of candidates of the alternative destination based on the profile information.

The profile information may be movement history information of the user.

The movement history information may be history information in which a landmark and location information of the user are associated.

The moving route of the moving body may be a delivery route through which the moving body delivers a parcel.

The control unit may acquire information about a status of an airframe of the moving body, and determine whether or not the moving body reaches the destination based on the status of the airframe.

The control unit may acquire the profile information in a case where it is determined that the moving body cannot reach the destination, calculate a movable distance of the moving body from the status of the airframe, and list the plurality of candidates of the alternative destination based on the calculated movable distance and the profile information.

The status of the airframe may include information about a remaining battery level of the moving body.

The moving body may be a flying body.

The information processing apparatus may be a server.

In order to solve the above problems, an information processing method by the information processing apparatus according to the embodiment of the present technology includes acquiring profile information of a user in a case where a moving route of a moving body intersects a moving route of other moving body; and setting an alternative destination of the moving route of the moving body based on the profile information.

In order to solve the above problems, an information processing system according to an embodiment of the present technology includes a moving body and an information processing apparatus.

The information processing apparatus sets an alternative destination of a moving route of the moving body based on profile information of a user in a case where the moving route of the moving body intersects a moving route of another moving body.

In order to solve the above problems, a program according to an embodiment of the present technology causes an information processing apparatus to execute steps of:

acquiring profile information of a user in a case where a moving route of a moving body intersect a moving route of another moving body; and setting an alternative destination of the moving route of the moving body based on the profile information.

BRIEF DESCRIPTION OF DRAWINGS

FIG. 2 is a data table showing an example of location information of a user.

FIG. 3 is a data table showing an example of an action history in which a landmark and location information of the user are associated.

FIG. 5 is a data table showing an example of a flight plan managed by a drone control service server of the information processing system.

FIG. 11 is a diagram showing an example of a list of destinations presented to the user.

MODE(S) FOR CARRYING OUT THE INVENTION

Hereinafter, embodiments of the present technology will be described with reference to the drawings.

[Configuration of Information Processing System]

Figure 1:
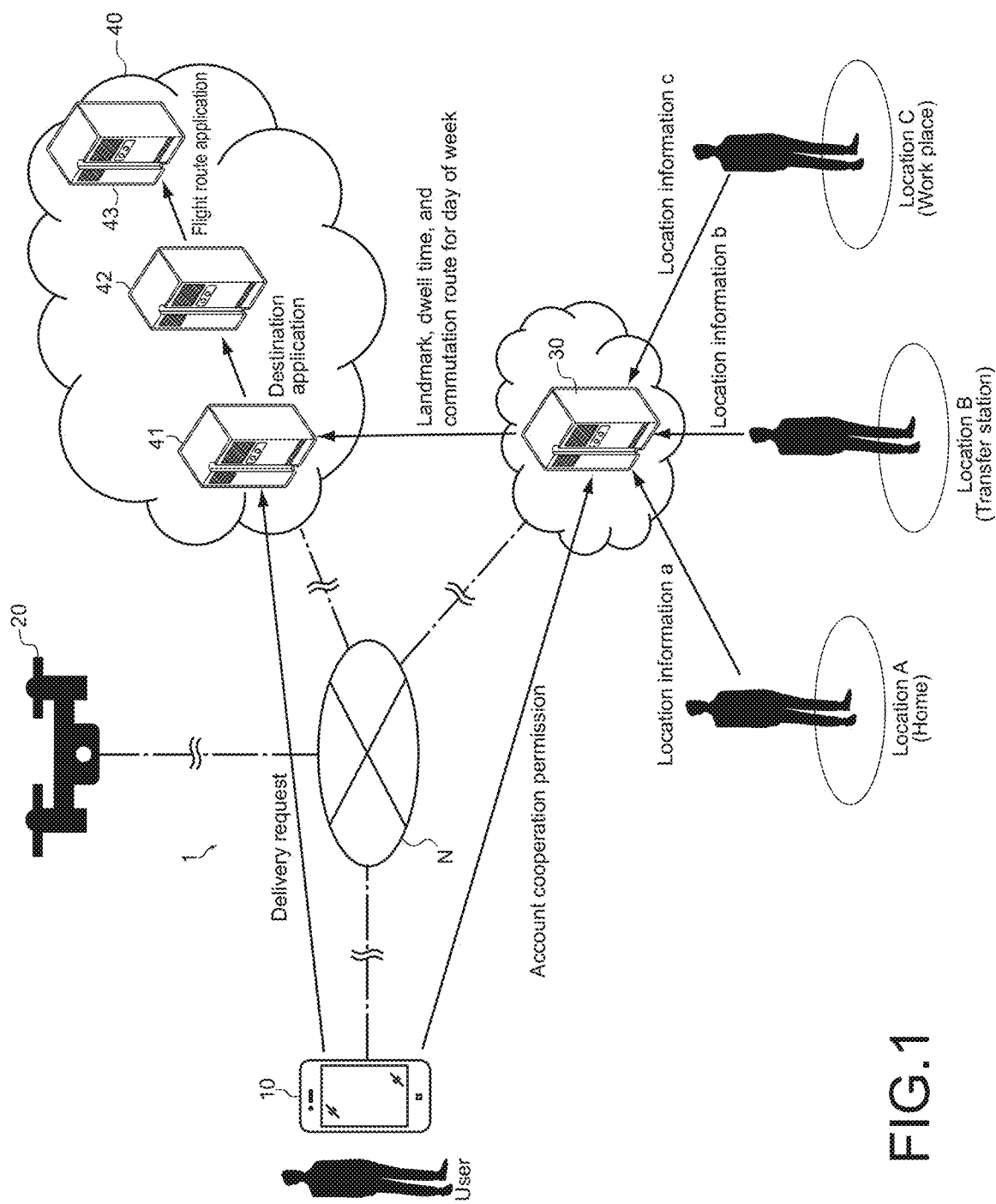
FIG. 1 is a diagram showing a configuration example of an information processing system of a present embodiment.

FIG. 1 is a diagram showing a configuration example of an information processing system 1 according to the present embodiment. As shown in FIG. 1, the information processing system 1 includes a terminal device 10, a drone airframe 20, a life log server 30, and a server group 40.

The terminal device 10, the drone airframe 20, the life log server 30, and the server group 40 (delivery service server 41) are connected to each other so as to be able to communicate with each other via a network N. The network N may be the Internet, a mobile communication network, a local area network, or the like, and may be a network in which a plurality of types of networks are combined.

(Terminal Device)

The terminal device 10 is a terminal handled by a user, and transmits a delivery request using the drone airframe 20 to the server group 40 (delivery service server 41) or notifies the life log server 30 of an account cooperation permission.

The terminal device 10 is, for example, a mobile terminal, a wearable device, or a personal computer (PC), and is typically the mobile terminal. The mobile terminal is, for example, a smartphone, a mobile phone terminal, or a tablet terminal. The wearable device may be, for example, an HMD (Head Mounted Display), smart eye glasses, a smart watch, a smart band, a smart earphone, and the like.

(Drone Airframe)

The drone airframe 20 is a flying body that autonomously flies based on a flight plan set in advance. The drone airframe 20 may be of a fixed-wing aircraft type or a rotary-wing aircraft type. If the drone airframe 20 is of the rotary-wing aircraft type, it may be, for example, any type of a tricopter, a quadcopter, a hexacopter or an octocopter. The drone airframe 20 is an example of a "moving body" in the claims.

(Life Log Server)

The life log server 30 stores location information of the user (FIG. 2) in time series and in association with landmark information (FIG. 3), and determines, for example, a commutation route of the user from a time zone such as a day of the week, continuity, a morning, or an afternoon.

The life log server 30 is typically a cloud server, but is not limited thereto, and may be any other computer such as a PC. FIG. 2 is a data table showing an example of the location information of the user, and FIG. 3 is a data table (profile information) showing an example of an action history in which the landmark and the location information of the user are associated.

(Server Group)

As shown in FIG. 1, the server group 40 includes a delivery service server 41, a route application service server 42, and a drone control service server 43.

The delivery service server 41 applies to the route application service server 42 a destination that is a desired delivery time and a desired delivery address of the user. The delivery service server 41 is an example of the "information processing apparatus" in the claims.

Figure 4:
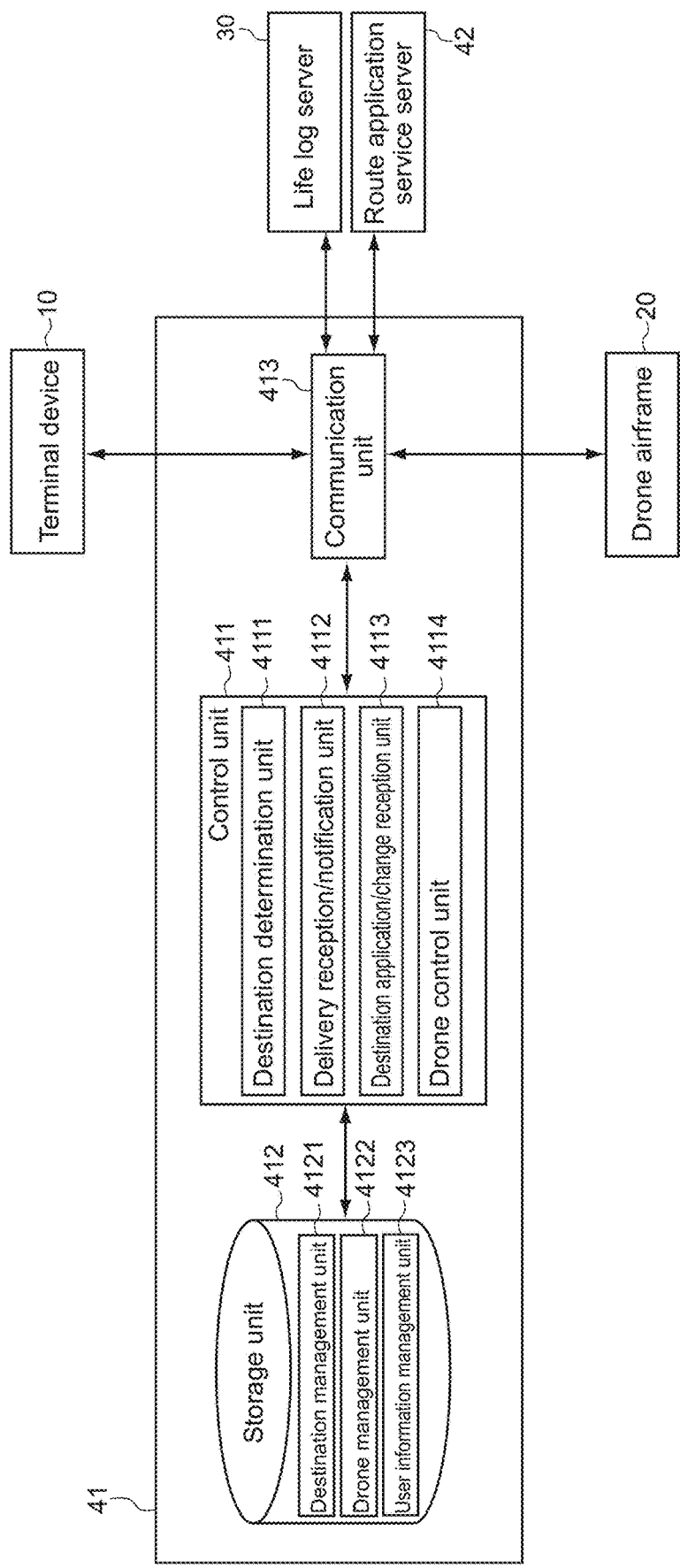
FIG. 4 is a functional block diagram showing a configuration example of a delivery service server of the information processing system.

FIG. 4 is a functional block diagram showing a configuration example of the delivery service server 41. The delivery service server 41 includes a control unit 411, a storage unit 412, and a communication unit 413.

The control unit 411 controls an overall operation of the delivery service server 41 or a part thereof in accordance with a program stored in the storage unit 412. The control unit 411 functionally includes a destination determination unit 4111, a delivery reception/notification unit 4112, a destination application/change reception unit 4113, and a drone control unit 4114.

The delivery reception/notification unit 4112 receives the delivery reception and a destination change request from the user via the terminal device 10. The destination application/change reception unit 4113 receives a destination application or a change request from the route application service server 42.

The drone control unit 4114 controls an operation of the drone airframe 20. The drone control unit 4114 executes control to acquire a status of the airframe from the drone airframe 20 or to instruct the drone airframe 20 to move.

The storage unit 412 functionally includes a destination management unit 4121, a drone management unit 4122, and a user information management unit 4123. The destination management unit 4121 manages and accumulates information about delivery addresses and destinations. The drone management unit 4122 manages and accumulates location information of the drone airframe 20, information about a remaining battery level, and the like. The user information management unit 4123 manages and accumulates a user's action log (e.g., a commutation route) and an access token for the life log server 30.

The communication unit 413 communicates with the terminal device 10, the drone airframe 20, the life log server 30, and the route application service server 42 via the network N. The communication unit 413 functions as a communication interface of the delivery service server 41.

The route application service server 42 plans a flight route of the drone airframe 20 from the delivery service server 41 to the applied destination, and applies to the drone control service server 43.

The drone control service server 43 plans flight plans (FIG. 5) that include routes of all drone airframes flying within a monitored range coverage. In a case where the flight plan (flight route) applied from the route application service server 42 competes with (intersects) the flight plan (flight route) of another drone, the drone control service server 43 returns a response encouraging a change of the flight route to the route application service server 42. FIG. 5 is a data table showing an example of the flight plan managed by the drone control service server 43.

The delivery service server 41, the route application service server 42, and the drone control service server 43 are typically cloud servers, but are not limited thereto, and may be any other computer, such as the PC.

[Hardware Configuration]

Figure 6:
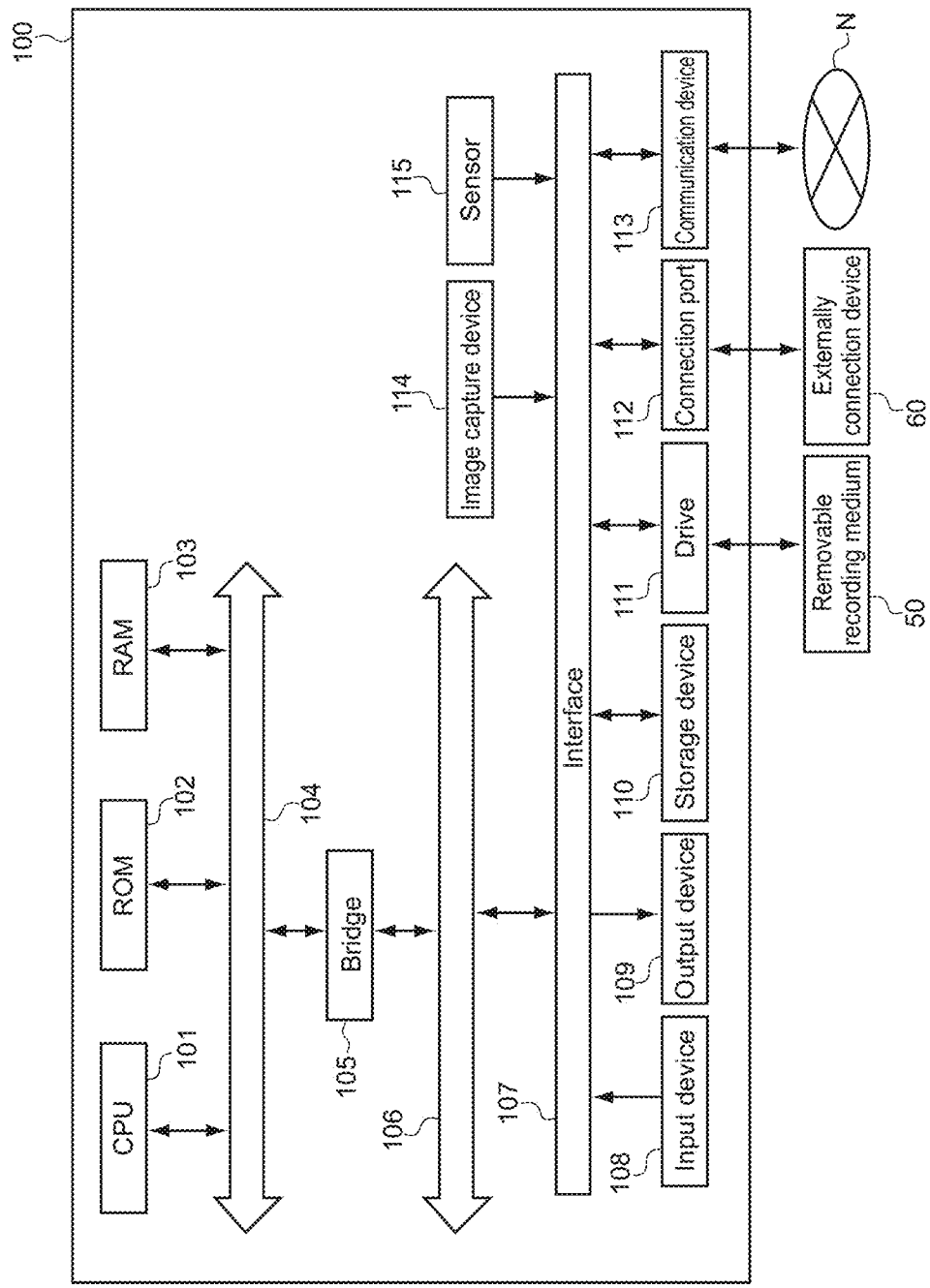
FIG. 6 is a block diagram showing an example of a hardware configuration of a drone airframe, a life log server, and a server group of the information processing system.

FIG. 6 is a block diagram showing an example of the hardware configuration of the drone airframe 20, the life log server 30, and the server group 40. The drone airframe 20, the life log server 30, and the server group 40 may be realized by the information processing apparatus 100 shown in FIG. 6.

The information processing apparatus 100 includes a CPU (Central Processing unit) 101, a ROM (Read Only Memory) 102, and a RAM (Random Access Memory) 103. The control unit 411 may be the CPU 101.

The information processing apparatus 100 may include a host bus 104, a bridge 105, an external bus 106, an interface 107, an input device 108, an output device 109, a storage device 110, a drive 111, a connection port 112, and a communication device 113.

In addition, the information processing apparatus 100 may include an image capture device 114 and a sensor 115, as necessary. Furthermore, the information processing apparatus 100 may include processing circuits such as a DSP (Digital Signal Processor), an ASIC (Application Specific Integrated Circuit), and an FPGA (Field-Programmable Gate Array) instead of or together with the CPU 101.

The CPU 101 functions as an arithmetic processing unit and a control unit, and controls the overall operation of the information processing apparatus 100 or a part thereof in accordance with various programs recorded on a ROM 102, a RAM 103, the storage device 110, or a removable recording medium 50. The storage unit 412 may be the ROM 102, the RAM 103, the storage device 110, or the removable recording medium 50.

The ROM 102 stores programs and arithmetic parameters to be used by the CPU 101. The RAM 103 temporarily stores programs to be used in the execution of the CPU 101, parameters that appropriately change in the execution of the programs, and the like.

The CPU 101, the ROM 102, and the RAM 103 are interconnected by the host bus 104 including an internal bus, such as a CPU bus. In addition, the host bus 104 is connected via the bridge 105 to the external bus 106 such as a peripheral component interconnect/interface (PCI) bus.

The input device 108 is a device operated by the user, such as a mouse, a keyboard, a touch panel, a button, a switch, and a lever. The input device 108 may be, for example, a remote control unit using infrared rays or other radio waves, or may be externally connection device 60 such as a mobile phone corresponding to the operation of the information processing apparatus 100.

The input device 108 includes an input control circuit for generating an input signal based on the information input by the user and outputting the generated input signal to the CPU 101. By operating the input device 108, the user inputs various types of data to the information processing apparatus 100 or instructs a processing operation.

The output device 109 includes a device capable of notifying the user of acquired information by using senses such as a sense of vision, a sense of hearing, and a sense of touch. The output device 109 may be, for example, a display device such as a liquid crystal display (LCD) or an organic electro-luminescence (EL) display, a sound output device such as a speaker or a headphone, or a vibrator.

The output device 109 outputs results acquired by the processing of the information processing apparatus 100 as a video including a text and an image, a sound including a voice and audio, or vibration.

The storage device 110 is a data storage device configured as an example of a storage unit of the information processing apparatus 100. The storage device 110 is configured by, for example, a magnetic storage device such as a hard disk drive (HDD), a semiconductor storage device, an optical storage device, or a magneto-optical storage device. The storage device 110 stores, for example, programs to be executed by the CPU 101, various types of data, and various types of data acquired from the outside.

The drive 111 is a reader/writer for the removable recording medium 50 such as a magnetic disc, an optical disc, a magneto-optical disc, or a semiconductor memory, and is built-in or externally attached to the information processing apparatus 100. The drive 111 reads information recorded on the removable recording medium 50 mounted thereon, and outputs the read information to the RAM 103. Furthermore, the drive 111 writes a record on the removable recording medium 50 mounted thereon.

The connection port 112 is a port for connecting the device to the information processing apparatus 100. The connection port 112 may be, for example, a universal serial bus (USB) port, an IEEE1394 port, or a small computer system interface (SCSI) port.

In addition, the connection port 112 may be an RS-232C port, an optical audio terminal, an HDMI™ (High-Definition Multimedia Interface) port, or the like. The externally connection device 60 is connected to the connection port 112, and thus various types of data can be exchanged between the information processing apparatus 100 and the externally connection device 60.

The communication device 113 is, for example, the communication interface including a communication device for connecting to the network N, or the like. The communication device 113 may be, for example, a communication card for LAN (Local Area Network), Bluetooth™, Wi-Fi, or WUSB (Wireless USB).

Furthermore, the communication device 113 may be a router for optical communication, a router for asymmetric digital subscriber line (ADSL), or modems for various types of communication. The communication device 113 transmits and receives signals and the like to and from the Internet or other communication devices by using a predetermined protocol such as TCP/IP.

Furthermore, the network N connected to the communication device 113 is a network connected in a wired or wireless manner and may include, for example, the Internet, a home LAN, infrared communication, radio wave communication, and satellite communication. The communication unit 413 may be the communication device 113.

The image capture device 114 is, for example, a device that captures a real space and generates a captured image by using various members including an image capture element such as a complementary metal oxide semiconductor (CMOS) or a charge coupled device (CCD), a lens for controlling formation of an object image on the image capture element, and the like. The image capture device 114 may capture a still image or may capture a moving image.

The sensor 115 is, for example, various sensors such as an acceleration sensor, an angular velocity sensor, a geomagnetic sensor, an illuminance sensor, a temperature sensor, an air pressure sensor, and a sound sensor (microphone).

The sensor 115 acquires, for example, information about a status of the information processing apparatus 100 itself such as a posture of a housing of the information processing apparatus 100, and information about surrounding environment of the information processing apparatus 100 such as brightness and noise around the information processing apparatus 100. In addition, the sensor 115 may include a GPS receiver that receives a global positioning system (GPS) signal to measure latitude, longitude, and altitude of the apparatus.

The configuration example of the information processing system 1 is described above. Respective components described above may be configured by using general-purpose members or may be configured by members and materials specialized for functions of the respective components. Such a configuration may be changed as appropriate depending on the technical level at the time of implementation.

[Information Processing Method]

Figure 7:
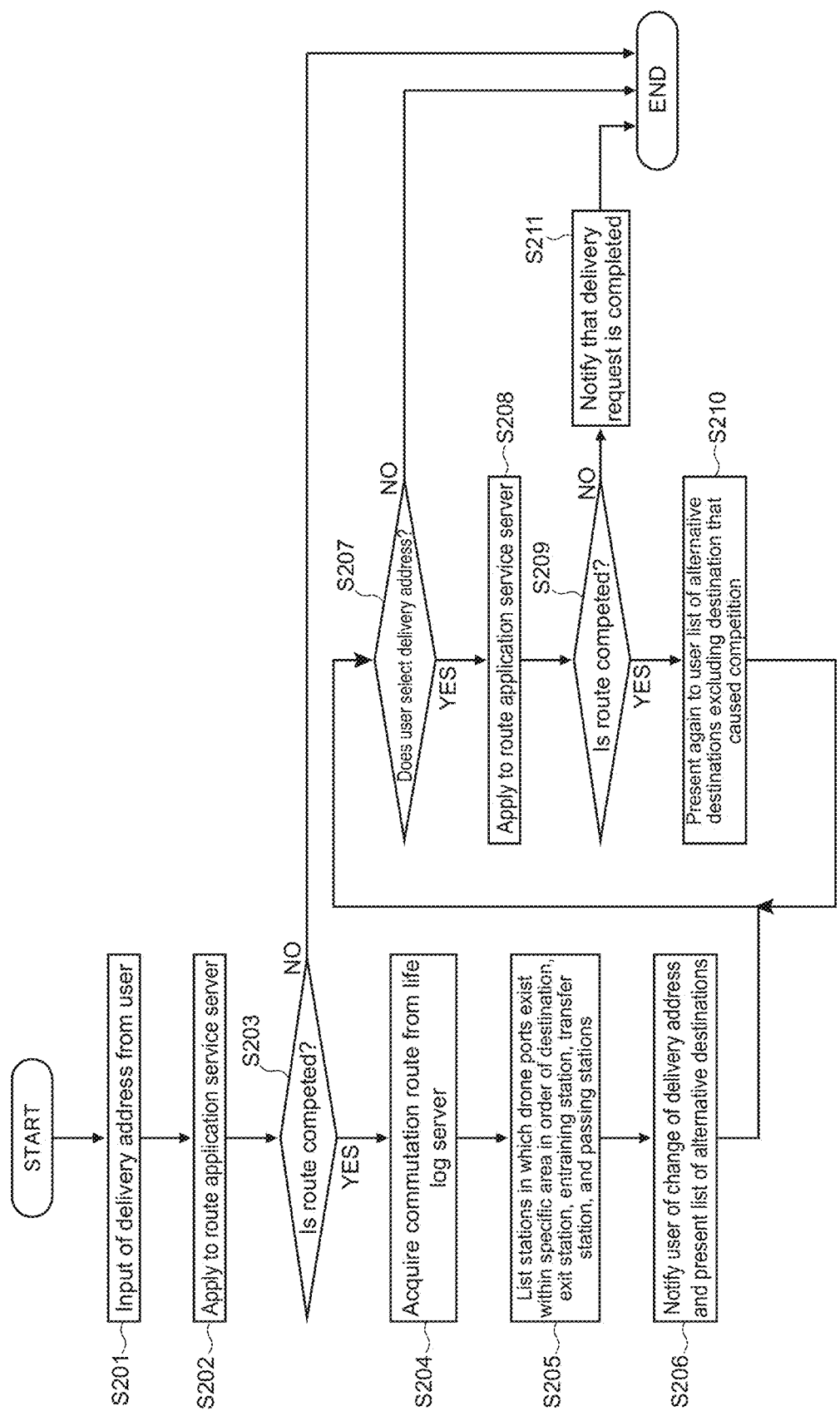
FIG. 7 is a flowchart showing a typical operation flow of the information processing system.
Figure 8:
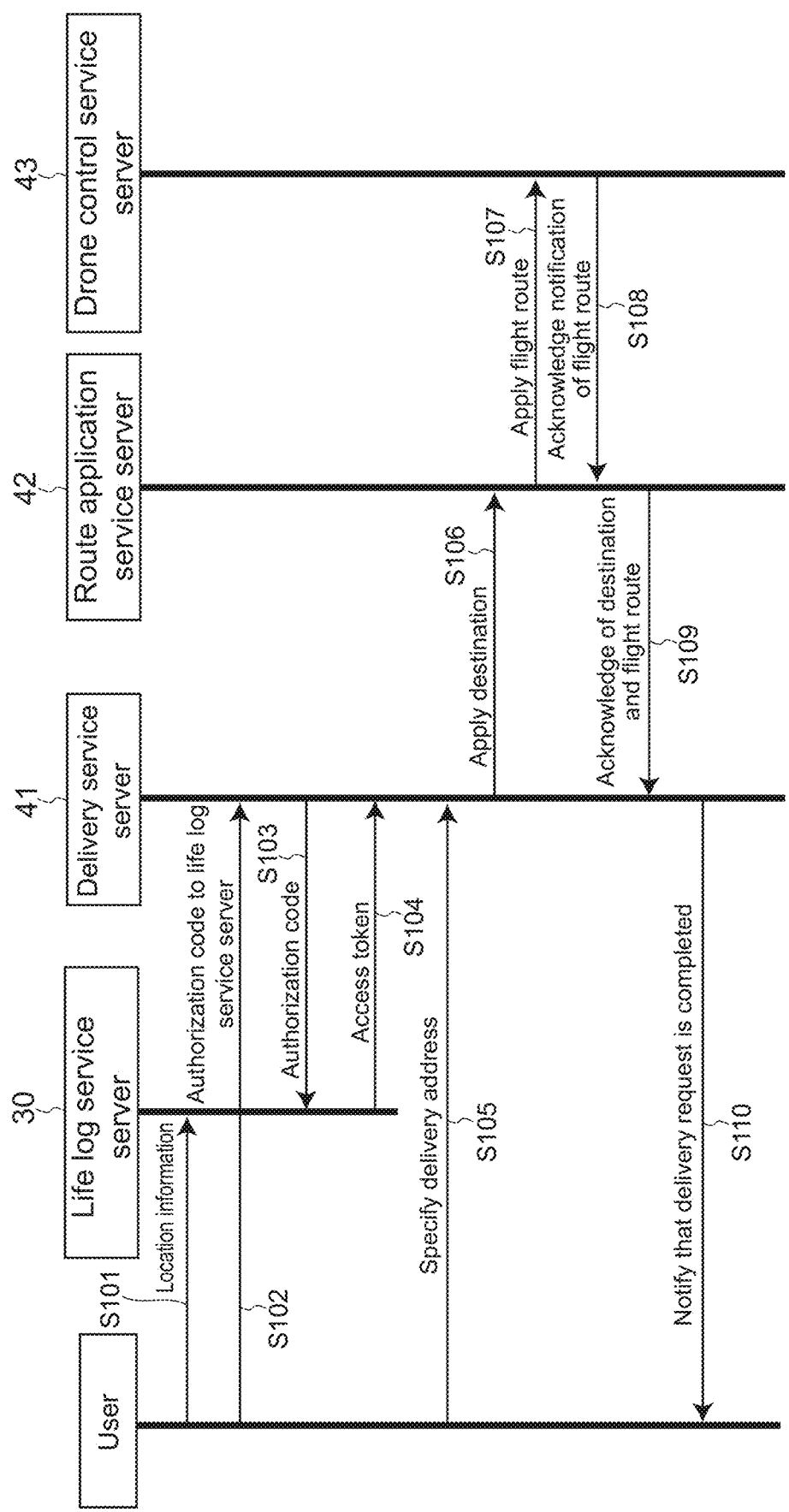
FIG. 8 is a sequence diagram showing an operational flow the information processing system.
Figure 9:
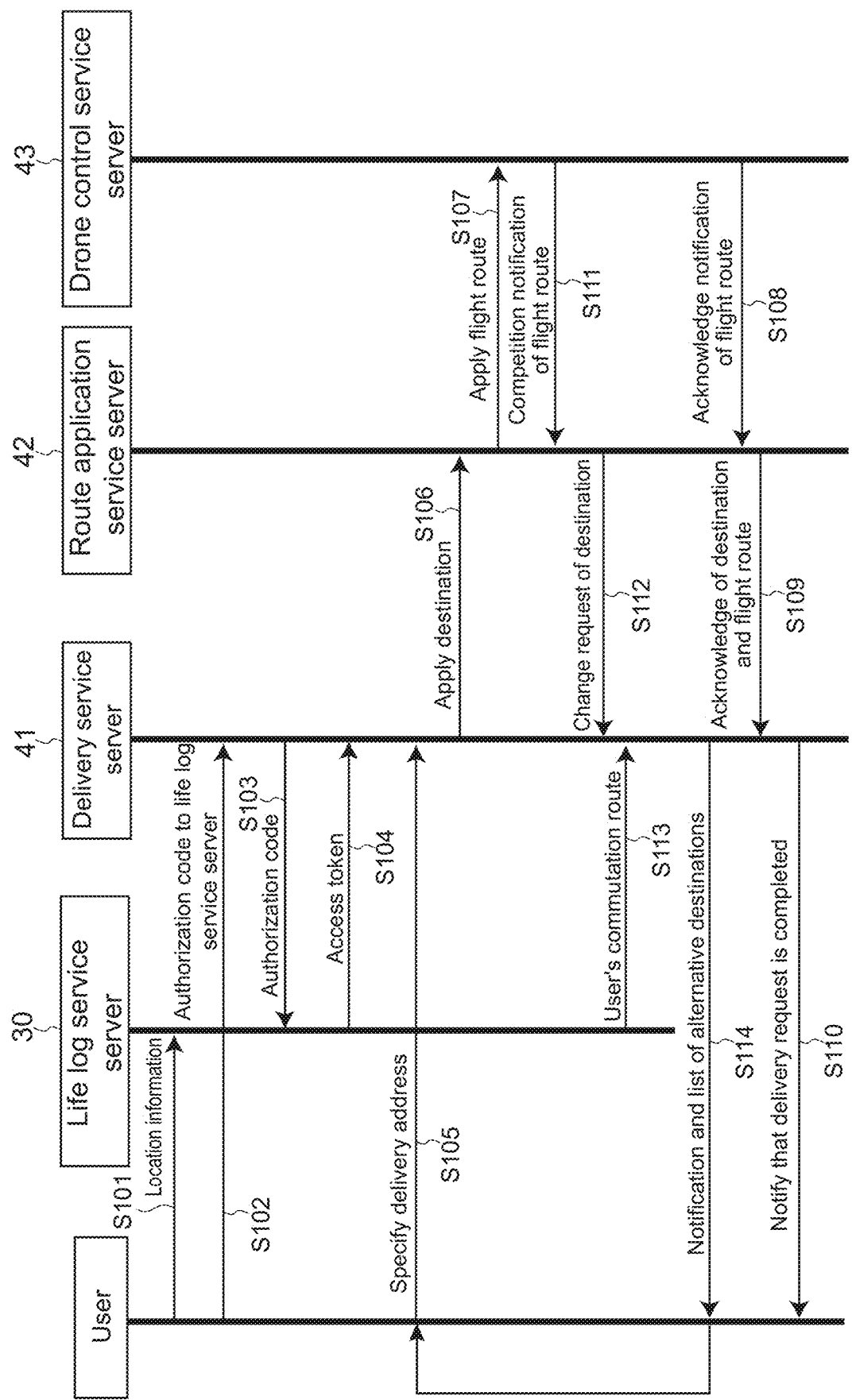
FIG. 9 is a sequence diagram showing the operational flow of the information processing system.
Figure 10:
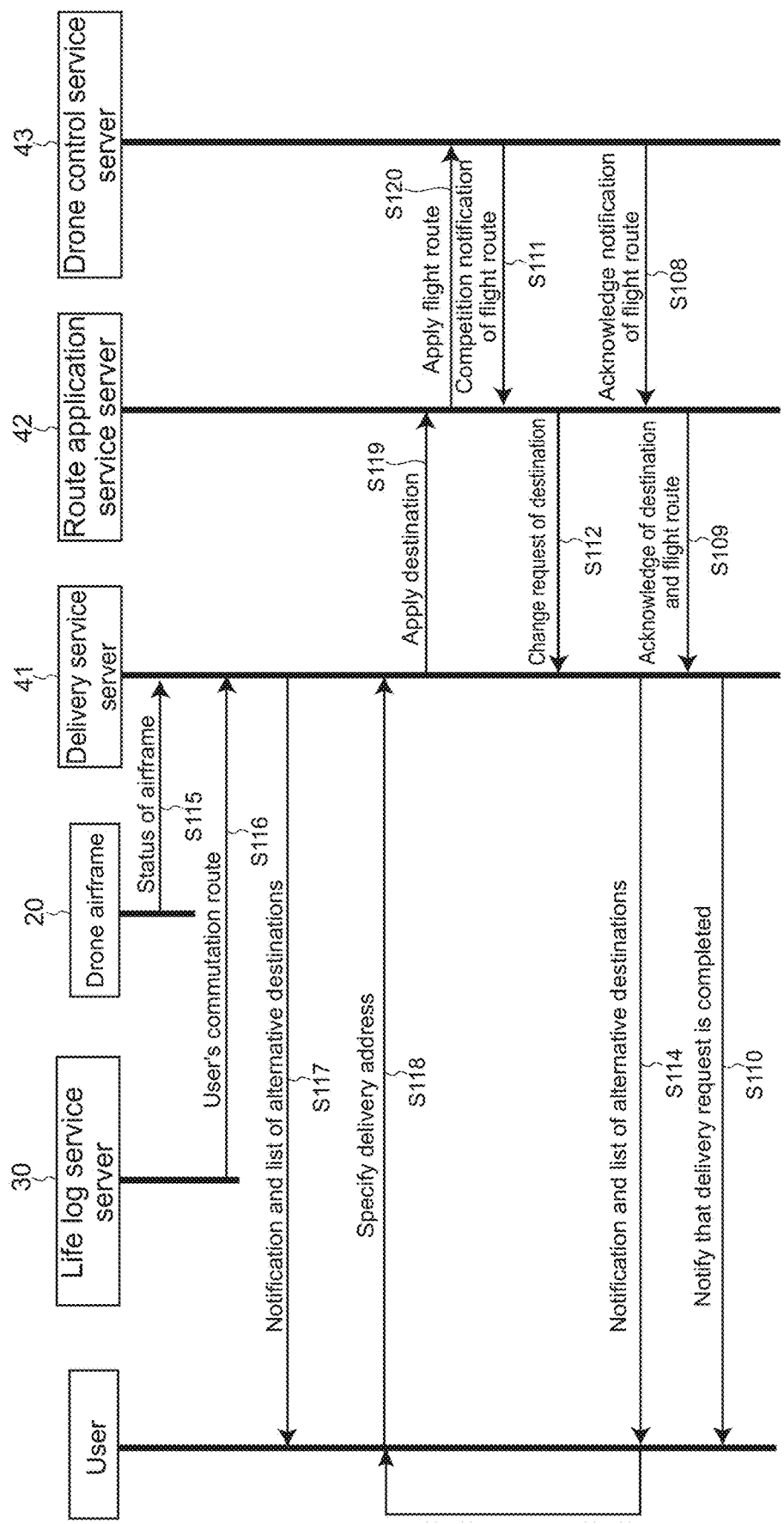
FIG. 10 is a sequence diagram showing the operational flow of the information processing system.

FIG. 7 is a flowchart showing a typical operation flow of the information processing system 1, and FIGS. 8 to 10 are sequence diagrams showing the operation flow of the information processing system 1. Hereinafter, with reference to FIGS. 7 to 10 as appropriate, some methods for determining the destination and the delivery route when delivering the parcel using the drone airframe 20 in cooperation with the drone control service server 43 will be described.

Application Example 1

First, the location information of the user detected by a GPS sensor or the like mounted on the terminal device 10 is transmitted to the life log server 30 via the terminal device 10 (Step S101). Then, the user transmits an authorization code to the delivery service server 41 through the terminal device 10 (Step S102).

Upon receipt of the authorization code from the user, the delivery service server 41 transmits the authorization code to the life log server 30 (Step S103). Upon receipt of the authorization code from the delivery service server 41, the life log server 30 transmits the access token to the delivery service server 41 (Step S104). Incidentally, Step S102 to Step S104 are steps according to the related art such as OAuth2, and allow the profile information (commutation route, etc.) of the user managed by the life log server 30 to be transmitted from the life log server 30 to the delivery service server 41.

Subsequently, the user specifies the delivery address to the delivery service server 41 via the terminal device 10 (Steps S105, S201). The delivery service server 41 receives a specification of the delivery destination from the user and applies the desired delivery time and the destination, which is the desired delivery address, to the route application service server 42 (Steps S106, S202).

The route application service server 42 plans the delivery route of the drone airframe 20 to the destination specified by the user, and applies the delivery route to the drone control service server 43 (Step S107). In a case where the delivery route applied from the route application service server 42 does not compete with (intersect) the flight route of another drone airframe (NO in Step S203), the drone control service server 43 transmits an acknowledge notification of the delivery route to the route application service server 42 (Step S108).

Upon receipt of the acknowledge notification from the drone control service server 43, the route application service server 42 transmits the destination applied in the previous Step S106 and the acknowledge notification of the delivery route planned in the previous Step S107 to the delivery service server 41. Upon receipt thereof, the delivery service server 41 notifies the terminal device 10 that the delivery request from the user is completed (Step S110).

Application Example 2

Next, a description will be given of an application example in a case where the delivery route of the drone airframe 20 competes with the travel route of another drone airframe. In Application Example 2, the same steps as in Application Example 1 are denoted by the same reference numerals, and descriptions thereof are omitted.

In a case where the delivery route applied from the route application service server 42 competes with (intersects) the flight route of another drone airframe (YES in Step S203), the drone control service server 43 notifies the route application service server 42 that the planned delivery route in the previous Step S107 competes therewith (Step S111).

Upon receipt of a competition notification from the drone control service server 43, the route application service server 42 transmits the change request for changing the destination specified by the user in the previous Step S105 to the delivery service server 41 (Step S112).

Upon receiving the destination change request from the route application service server 42, the delivery service server 41 acquires the user's commutation route from the life log server 30 (Steps S113, S204), and generates a list of alternative destinations (see FIG. 11) based on the commutation route and the desired delivery date and time.

At this time, when the user uses a train for commuting, for example, the delivery service server 41 lists stations in which the drone ports exist within a specific area (for example, 300 m) in the order of the destination on the commutation route (specific building such as building of user's work place, for example), an exit station, an entraining station, a transfer station, and passing stations (Step S205). If there are a plurality of drone ports, the delivery service server 41 selects the closest drone port from a user's current location and presents a list of destinations to the user along with a distance from the station.

As a result, when it becomes necessary to change the delivery route of the drone airframe 20, the alternative destinations useful for the user are displayed in order, the selection of the alternative destinations by the user becomes easy, and convenience when the user receives the parcel is improved.

The delivery service server 41 then notifies the user of a change of the delivery address and presents the list of the alternative destinations to the user (Steps S114, S206). When the destination is newly specified by the user from the list of alternative destinations (YES in the Steps S105, S207), the delivery service server 41 applies the destination to the route application service server 42 (Steps S106, S208).

The route application service server 42 newly plans the delivery route of the drone airframe 20 to the alternative destination specified in the previous Step S207, and applies this delivery route to the drone control service server 43 (Step S107). In a case where the delivery route applied for from the route application service server 42 does not compete with (intersect) the flight route of another drone airframe (NO in Step S209), the drone control service server 43 transmits the acknowledge notification of the delivery route to the route application service server 42 (Step S108).

Upon receipt of the acknowledge notification from the drone control service server 43, the route application service server 42 transmits, to the delivery service server 41, the acknowledge notification of the alternative destination applied in the previous Step 207 and the acknowledge notification of the delivery route planned in the previous Step S107 (Step S109). Upon receipt thereof, the delivery service server 41 notifies the terminal device 10 that the delivery request from the user is completed (Steps S110, S211).

On the other hand, in a case where the delivery route applied from the route application service server 42 competes with (intersects) the flight route of another drone airframe (YES in Step S209), the drone control service server 43 notifies the route application service server 42 that the delivery route planned in the previous Step S107 competes therewith (Step S111).

Upon receipt of the competition notification of the delivery route from the drone control service server 43, the route application service server 42 transmits a change request for changing the alternative destination specified by the user in the previous Step S107 to the delivery service server 41 (Step S112).

Upon receipt of the change request of the destination from the route application service server 42, the delivery service server 41 newly generates the list of alternative destinations excluding the destination that caused competition and presents again the list to the user (Steps S114, S210).

Application Example 3

Next, a description will be given of an application example in which the delivery service server 41 causes the user to select the alternative destination in a case where the drone airframe 20 becomes unable to reach the original destination due to an insufficient battery charge during flight. In Application Example 3, steps similar to those in Application Examples 1 and 2 are denoted by the same reference numerals, and descriptions thereof are omitted.

The delivery service server 41 acquires the status of the airframe including the remaining battery level from the drone airframe 20 in real time (Step S115) and determines whether or not the drone airframe 20 can reach the destination from the remaining battery level.

In a case where the delivery service server 41 determines that the drone airframe 20 cannot reach the destination from the remaining battery level, the delivery service server 41 acquires the commutation route from the life log server 30 (Step S116), and calculates a flyable distance (movable distance) of the drone airframe 20 from the remaining battery level of the drone airframe 20.

Next, the delivery service server 41 generates the list of the alternative destinations in the same manner as in the previous Step S205 based on the calculated flyable distance and the commutation route acquired in the previous Step S116. The delivery service server 41 notifies the user that the destination cannot be reached due to the insufficient battery charge and presents a list of alternative destinations (Step S117).

In a case where the destination is newly specified by the user from the list of alternative destinations (Step S118), the delivery service server 41 applies the destination to the route application service server 42 (Step S119). Alternatively, after the delivery service server 41 notifies that the destination cannot be reached in the previous Step S117, if the destination is not specified from the user within a certain period of time, the alternative destination may be selected in order from the top of the list of alternative destinations.

The route application service server 42 newly plans the delivery route of the drone airframe 20 to the alternative destination specified in the previous Step S118, and applies this delivery route to the drone control service server 43 (Step S120).

<Modifications>

Although the embodiments of the present technology are described above, it should be appreciated that the present technology is not limited to the embodiments described above and various modifications may be made thereto.

For example, a notification of the destination change request from the delivery service server 41 and presentation of the list of the alternative destinations to the user are not limited to once, but may be appropriately performed during a flight of the drone airframe 20.

In the above-described embodiments, the delivery service server 41 receives the specification of the delivery destination from the user, but it is not limited thereto. When the information processing system 1 executes the above-described information processing method, an application for applying the delivery installed in the terminal device 10 may directly acquire the profile information (such as the commutation route) of the user from the life log server 30.

<Supplement>

The present technology may be applied to a moving body (for example, a robot) other than the flying body, and a usage thereof is not particularly limited. Note that the flying body may include an aircraft, an unmanned airplane, an unmanned helicopter, or the like in addition to the drone airframe.

In addition, the effects described herein are illustrative or exemplary only and not restrictive. In other words, the present technology may provide other effects apparent to those skilled in the art from the description herein, in addition to or instead of the effects described above.

Although the suitable embodiments of the present technology are described in detail above with reference to the accompanying drawings, the present technology is not limited to such embodiments. It is apparent that persons who have common knowledge in the technical field of the present technology could conceive various alterations or modifications within the scope of a technical idea according to the embodiments of the present technology. It is appreciated that such alterations or modifications also fall under the technical scope of the present technology.

The present technology may also have the following structures.

(1)

An information processing apparatus, including:
 a control unit that sets an alternative destination of a moving route of a moving body based on profile information of a user in a case where the moving route of the moving body intersects a moving route of other moving body.

(2)

The information processing apparatus according to (1), in which
 the control unit acquires the profile information in a case where the moving route of the moving body intersects the moving route of the other moving body, and
 lists a plurality of candidates of the alternative destination based on the profile information.

(3)

The information processing apparatus according to (1) or (2), in which
 The profile information is movement history information of the user.

(4)

The information processing apparatus according to (3), in which
 The movement history information is history information in which a landmark and location information of the user are associated.

(5)

The information processing apparatus according to any one of (1) to (4), in which
 The moving route of the moving body is a delivery route through which the moving body delivers a parcel.

(6)

The information processing apparatus according to any one of (1) to (5), in which
 the control unit
 acquires information about a status of an airframe of the moving body, and determines whether or not the moving body reaches the destination based on the status of the airframe.

(7) The information processing apparatus according to (6), in which
the control unit
acquires the profile information in a case where it is determined that the moving body cannot reach the destination,
calculates a movable distance of the moving body from the status of the airframe, and
lists the plurality of candidates of the alternative destination based on the calculated movable distance and the profile information.

(8) The information processing apparatus according to (6) or (7), in which
the status of the airframe includes information about a remaining battery level of the moving body.

(9) The information processing apparatus according to any one of (1) to (8), in which
the moving body is a flying body.

(10) The information processing apparatus according to any one of (1) to (9), in which
the information processing apparatus is a server.

(11) An information processing method by an information processing apparatus, including:
acquiring profile information of a user in a case where a moving route of a moving body intersects a moving route of other moving body; and
setting an alternative destination of the moving route of the moving body based on the profile information.

(12) An information processing system, including:
a moving body; and
an information processing apparatus that sets an alternative destination of a moving route of a moving body based on profile information of a user in a case where the moving route of the moving body intersects a moving route of another moving body.

(13) A program that causes an information processing apparatus to execute steps of:
acquiring profile information of a user in a case where a moving route of a moving body intersect a moving route of another moving body; and
setting an alternative destination of the moving route of the moving body based on the profile information.

REFERENCE SIGNS LIST 1 information processing system
10 terminal device
20 drone airframe
30 life log server
40 server group
41 delivery service server
42 route application service server
43 drone control service server

The invention claimed is:

1. An information processing apparatus, comprising:
processing circuitry configured to
set an alternative destination of a moving route of a flying moving body based on profile information of a user and remaining battery level of the flying moving body in a case where the moving route of the flying moving body intersects a moving route of another flying moving body;
list a plurality of candidates of the alternative destination based on the profile information and the remaining battery level, wherein the profile information includes movement history information of the user that is history information in which a landmark and location information of the user are associated with each other in time series;
send the alternative destination of the moving route of the flying moving body to the flying moving body to enable the flying moving body to navigate to the alternative destination;
acquire information about a status of an airframe of the flying moving body, wherein the status of the airframe includes a remaining battery level of the flying moving body in realtime;
determine whether or not the flying moving body reaches the alternative destination based on the remaining battery level of the flying moving body;
acquire the profile information in a case where it is determined that the flying moving body cannot reach the alternative destination;
calculate a movable distance of the flying moving body from the remaining battery level of the airframe; and
in the case that flying moving body cannot reach the alternative destination from the remaining battery level, notify the user that the flying moving body cannot reach the alternative destination due to insufficient level of the remaining battery and notify the user of the list of the plurality of candidates of the alternative destination based on the calculated movable distance and the profile information.

2. The information processing apparatus according to claim 1, wherein
the processing circuitry is configured to acquire the profile information in the case where the moving route of the flying moving body intersects the moving route of the other flying moving body.

3. The information processing apparatus according to claim 1, wherein
the moving route of the flying moving body is a delivery route through which the flying moving body delivers a parcel.

4. The information processing apparatus according to claim 1, wherein
the information processing apparatus is a server.

5. An information processing method by an information processing apparatus, comprising:
acquiring profile information of a user in a case where a moving route of a flying moving body intersects a moving route of another flying moving body;
setting an alternative destination of the moving route of the flying moving body based on the profile information and remaining battery level of the flying moving body;
listing a plurality of candidates of the alternative destination based on the profile information and the remaining battery level, wherein the profile information includes movement history information of the user that is history information in which a landmark and location information of the user are associated with each other in time series;

sending the alternative destination of the moving route of the flying moving body to the flying moving body to enable the flying moving body to navigate to the alternative destination;

acquiring information about a status of an airframe of the flying moving body, wherein the status of the airframe includes a remaining battery level of the flying moving body in realtime;

determining whether or not the flying moving body reaches the alternative destination based on the remaining battery level of the flying moving body;

acquiring the profile information in a case where it is determined that the flying moving body cannot reach the alternative destination;

calculating a movable distance of the flying moving body from the remaining battery level of the airframe; and in the case that flying moving body cannot reach the alternative destination from the remaining battery level, notifying the user that the flying moving body cannot reach the alternative destination due to insufficient level of the remaining battery and notifying the user of the list of the plurality of candidates of the alternative destination based on the calculated movable distance and the profile information.

6. An information processing system, comprising:
a flying moving body; and
an information processing apparatus that
   sets an alternative destination of a moving route of the flying moving body based on profile information of a user and remaining battery level of the flying moving body in a case where the moving route of the flying moving body intersects a moving route of another flying moving body,
   lists a plurality of candidates of the alternative destination based on the profile information and the remaining battery level, wherein the profile information includes movement history information of the user that is history information in which a landmark and location information of the user are associated with each other in time series;
   sends the alternative destination of the moving route of the flying moving body to the flying moving body to enable the flying moving body to navigate to the alternative destination;
   acquires information about a status of an airframe of the flying moving body, wherein the status of the airframe includes a remaining battery level of the flying moving body in real time;
   determines whether or not the flying moving body reaches the alternative destination based on the remaining battery level of the flying moving body;
   acquires the profile information in a case where it is determined that the flying moving body cannot reach the alternative destination;
   calculates a movable distance of the flying moving body from the remaining battery level of the airframe; and in the case that flying moving body cannot reach the alternative destination from the remaining battery level, notifies the user that the flying moving body cannot reach the alternative destination due to insufficient level of the remaining battery and notifies the user of the list of the plurality of candidates of the alternative destination based on the calculated movable distance and the profile information.

7. A non-transitory computer-readable medium storing thereon executable instructions, which when executed by processing circuitry, cause the processing circuitry to execute a method, the method comprising:
   acquiring profile information of a user in a case where a moving route of a flying moving body intersects a moving route of another flying moving body;
   setting an alternative destination of the moving route of the flying moving body based on the profile information and remaining battery level of the flying moving body;
   listing a plurality of candidates of the alternative destination based on the profile information and the remaining battery level, wherein the profile information includes movement history information of the user that is history information in which a landmark and location information of the user are associated with each other in time series;
   sending the alternative destination of the moving route of the flying moving body to the flying moving body to enable the flying moving body to navigate to the alternative destination;
   acquiring information about a status of an airframe of the flying moving body, wherein the status of the airframe includes a remaining battery level of the flying moving body in realtime;
   determining whether or not the flying moving body reaches the alternative destination based on the remaining battery level of the flying moving body;
   acquiring the profile information in a case where it is determined that the flying moving body cannot reach the alternative destination;
   calculating a movable distance of the flying moving body from the remaining battery level of the airframe; and
   in the case that flying moving body cannot reach the alternative destination from the remaining battery level, notifying the user that the flying moving body cannot reach the alternative destination due to insufficient level of the remaining battery and notifying the user of the list of the plurality of candidates of the alternative destination based on the calculated movable distance and the profile information.

8. The information processing apparatus according to claim 1, wherein the location information of the user includes latitude and longitude coordinates.

* * * * *